United States Patent [19]

Imasaka et al.

[11] Patent Number: 5,106,498
[45] Date of Patent: Apr. 21, 1992

[54] FILTER PRESS

[75] Inventors: Noboru Imasaka; Shinzi Ishii; Shinzi Kaneko; Takashi Kikkawa, all of Tokyo, Japan

[73] Assignee: Tsukishima Kikai Co., Ltd., Tokyo, Japan

[21] Appl. No.: 583,919

[22] Filed: Sep. 17, 1990

[51] Int. Cl.⁵ .................................... B01D 25/133
[52] U.S. Cl. ................... 210/225; 210/227; 210/231
[58] Field of Search ............... 210/225, 227, 230, 231; 100/198, 199

[56] References Cited

U.S. PATENT DOCUMENTS 4,108,777  8/1978  Kurita et al. ................... 210/225

FOREIGN PATENT DOCUMENTS

| 0177170 | 9/1986 | European Pat. Off. . |
| 1954490 | 5/1970 | Fed. Rep. of Germany . |
| 53-36772 | 5/1978 | Japan . |
| 55-1886(A) | 1/1980 | Japan . |
| 55-54007(A) | 4/1980 | Japan . |
| 59-112813(A) | 6/1984 | Japan . |
| 59-150512(A) | 8/1984 | Japan . |
| 1258836 | 12/1971 | United Kingdom . |
| 1554803 | 10/1979 | United Kingdom . |

Primary Examiner—W. Gary Jones
Assistant Examiner—Matthew O. Savage
Attorney, Agent, or Firm—Armstrong, Nikaido, Marmelstein, Kubovcik & Murray

[57] ABSTRACT

A filter press according to the present invention comprises tension bearing means which are mounted on the filter plates respectively and which prevent movements of the forward ends of the filter cloths to bear the tensions for drawing out the forward ends of the filter cloths from the cloth reservoir means when the distance between the filter plates is decreased to bring the filter plates adjacent to each other into contact with each other, so that the tensions of the filter cloths are not applied to the drawing means when the distance between the filter plates is decreased. Therefore, attitudes of the filter plates are not changed by the tensions of the filter cloths and the filter plates can be brought into intimate contact with each other with constant pressure therebetween.

7 Claims, 10 Drawing Sheets

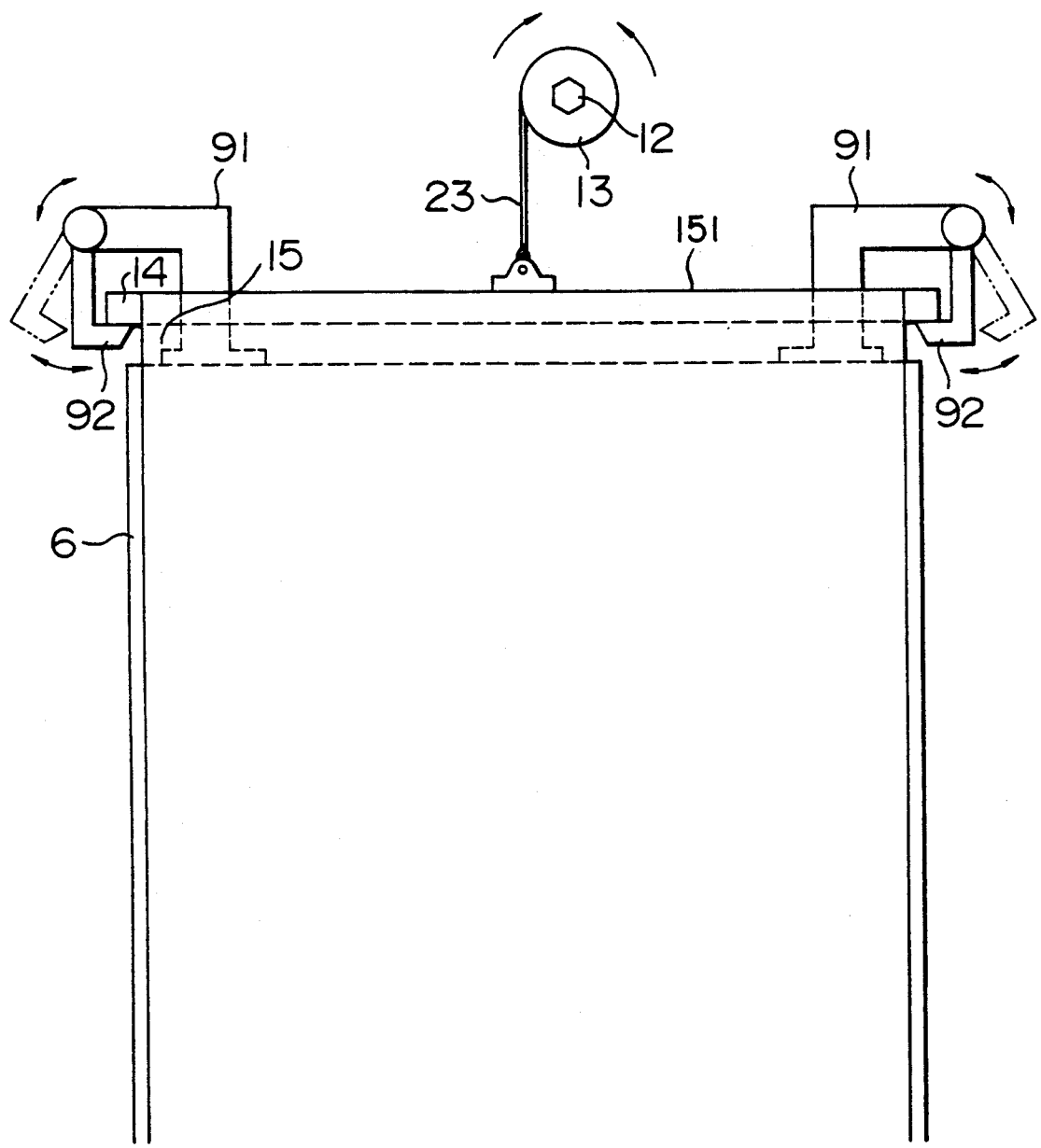

ure of an embodiment of a filter press according to the present invention,

FILTER PRESS

BACKGROUND OF THE INVENTION AND RELATED ART STATEMENT

The present invention relates to a filter press in which sludge is compressed and dehydrated between filter cloths, or more particularly relates to a filter cloth driving means used in the filter press.

A conventional filter press as shown, for example, in the publication of Japanese Patent Unexamined Publication No. 53-36772, comprises a plurality of movable filter plates each of which has at least one pressing surface, a guide device for guiding the filter plates in a filter plate moving direction, a plurality of filter cloths extending over the pressing surfaces respectively and being capable of moving thereover, a filter plate driving device for moving the filter plates so that the pressing surfaces adjacent to each other are brought into contact with each other through the filter cloths, a plurality of filter cloth reservoirs which are mounted on the filter plates respectively and which apply a predetermined tension to the filter cloths extending over the pressing surfaces of the filter plates so that the filter cloths are drawn toward the filter cloth reservoirs, a plurality of filter cloth tension devices which are fixed on the filter plates respectively and which draw out the filter cloths from the filter cloth reservoirs so that the filter cloths cover the pressing surfaces with the predetermined tension, shafts which engage with the filter cloth tension devices to supply a driving force to the filter cloth tension devices and on which the filter cloth tension devices are movable in a longitudinal direction of the shafts, and at least one compression device for compressing sludge inserted between the filter cloths between the pressing surfaces when the pressing surfaces adjacent to each other are brought into contact with each other.

OBJECT AND SUMMARY OF THE INVENTION

An object of the present invention is to provide a filter press in which pressing pressure applied to filter cloths between the pressing planes is constant over the whole of the pressing planes.

A filter press according to the present invention, comprises at least two filter plates each of which has at least one pressing plane and in which a distance between the filter plates adjacent to each other is changed to bring the pressing planes adjacent to each other into contact with each other, guiding means which guide the filter plates in a filter plate transferring direction so that the pressing planes can be brought into contact with each other, at least two filter cloths which extend over the pressing planes respectively and which is capable of moving over the pressing planes, filter plate driving means which changes in the filter plate transferring direction the distance between the filter plates adjacent to each other to bring the pressing planes adjacent to each other into contact with each other through the filter cloths, cloth reservoir means which are mounted on the filter plates respectively and which apply a predetermined tension to the filter cloths so that the filter cloths are drawn toward the filter cloth reservoirs, drawing means which are connected to the filter plates respectively so that the drawing means move in accordance with a change of the distance between the filter plates and which draw out forward ends of the filter cloths from the cloth reservoir means so that the filter cloths extend over the pressing planes respectively, shaft means which engage with the drawing means to supply driving force thereto for drawing out the forward ends of the filter cloths from the cloth reservoir means and on which the drawing means can slide to move in accordance with the change of the distance between the filter plates, and compression means adapted for compressing sludge inserted between the filter cloths between the pressing surfaces when the pressing surfaces adjacent to each other are brought into contact with each other, wherein, the filter press further comprises tension bearing means which are mounted on the filter plates respectively and which prevent movements of the forward ends of the filter cloths to bear the tensions for drawing out the forward ends of the filter cloths from the cloth reservoir means when the distance between the filter plates is decreased to bring the filter plates adjacent to each other into contact with each other, so that the tensions of the filter cloths are not applied to the drawing means when the distance between the filter plates is decreased.

In the filter press according to the present invention, since the tension bearing means are mounted on the filter plates respectively and prevent the movements of the forward ends of the filter cloths to bear the tensions of the filter cloths when the distance between the filter plates is changed, the tensions of the filter cloths are born by the tension bearing means and the cloth reservoir means and are not applied to slide portions between the shaft means and the drawing means. Therefore, frictional forces between the shaft means and the drawing means are small so that the frictional forces do not change attitudes of the filter plates connected to the drawing means, that is, the filter plates connected to the drawing means are not rotated by rotational moments generated by the frictional forces between the shaft means and the drawing means when the drawing means move in accordance with the decrease of the distance between the filter plates, so that the pressing surfaces adjacent to each other can be brought into wholely intimate contact with each other through the filter cloths and the pressing pressure applied to the filter cloths between the pressing planes is constant over the whole of the pressing planes.

BRIEF DESCRIPTION OF THE DRAWINGS

FIG. 9 is a schematic plane view showing the other embodiments of the filter cloth drawing device and the tension bearing device used in the filter press according to the present invention.

DETAILED DESCRIPTION OF PREFERRED EMBODIMENTS

Figure 1:
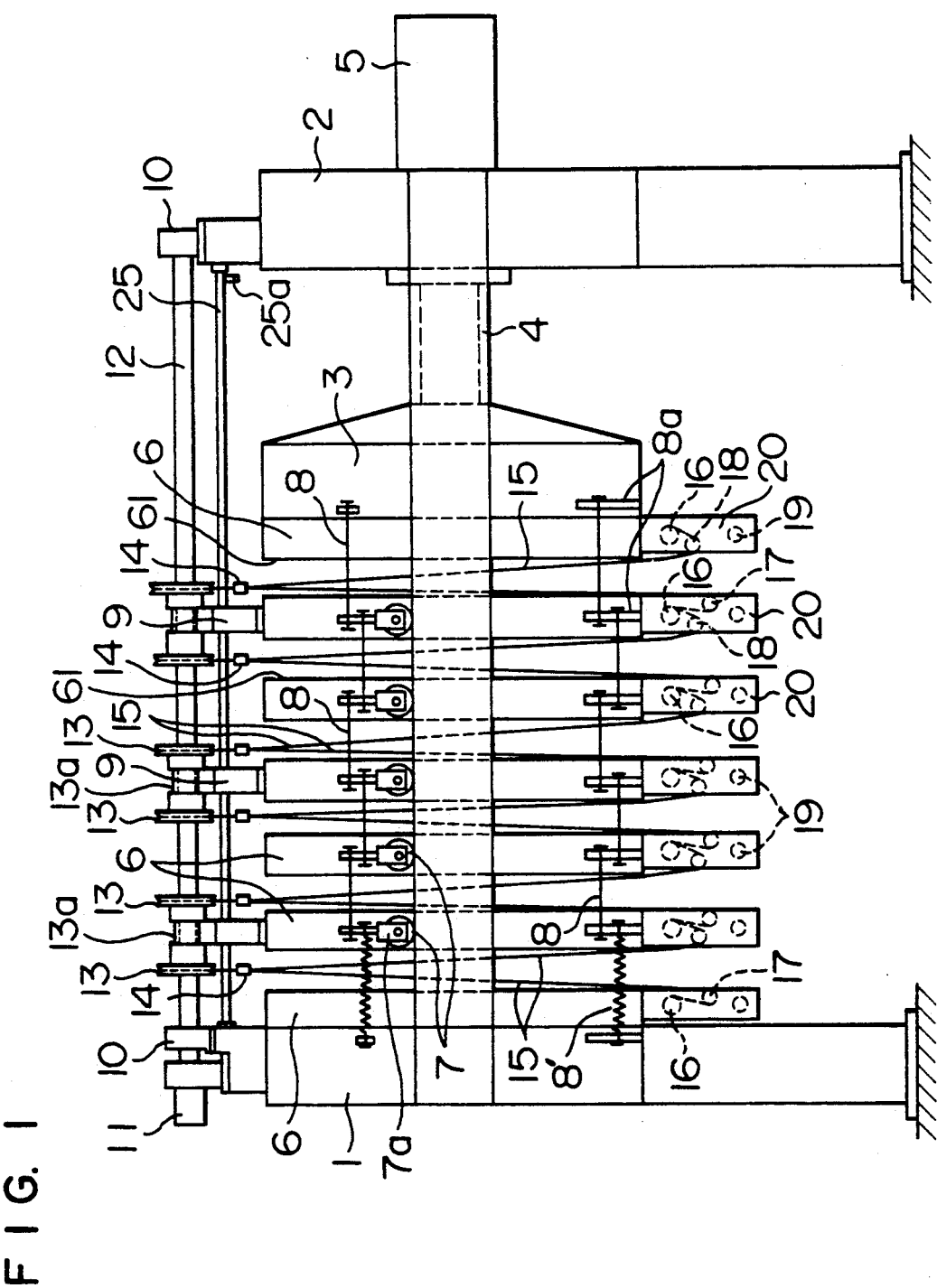
FIG. 1 is a plane view showing a longitudinal structure of an embodiment of a filter press according to the present invention.
Figure 2:
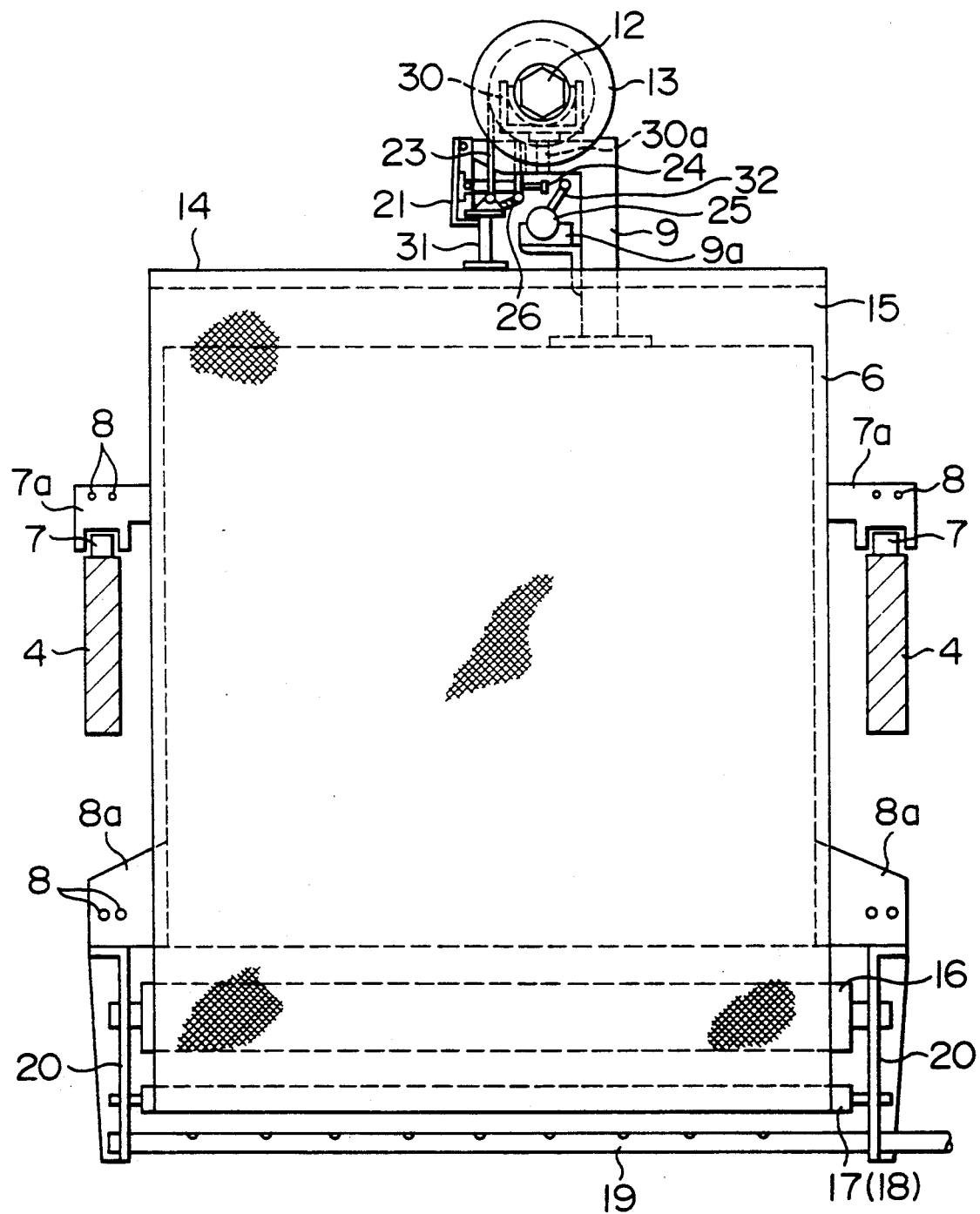
FIG. 2 is a cross sectional view of the embodiment of FIG. 1.

In a filter press as shown in FIGS. 1 and 2, a frame 1 and a frame 2 with a cylinder 5 stand with a distance therebetween on a floor. Two horizontal beams extend between the frame 1 and the frame 2. A plurality of filter plates 6 are arranged between the frame 1 and the frame 2 and the most left-side one of the filter plates 6 is fixed to the frame 1 and the most right-side one of the filter plates 6 is fixed to a head 3 moved in a horizontal direction by the cylinder 5 mounted on the frame 2. The filter plates 6 other than the filter plates 6 fixed to the frame 1 or connected to the head 3 are movable and guided in the horizontal direction by the horizontal beams 4 through rotatable guide rollers 7 which are mounted on the filter plates 6 through brackets 7a to run along the horizontal beams 4 and whose rotational axes extend horizontally and perpendicularly to longitudinal axes of the horizontal beams 4. Between the filter plates 6 which are other than the filter plate 6 fixed to the frame 1 and are adjacent to each other, tie-rods 8 are supported by the brackets 7a and brackets 8a fixed to the filter plates 6 so that distances between the filter plates 6 adjacent to each other are prevented from increasing more than a predetermined degree when the filter plate 6 connected to the head 3 is moved rightward by the cylinder 5. The filter plate 6 fixed to the frame 1 is connected to the filter plate 6 adjacent thereto by a spring 8'. Each of the filter plates 6 has at least one pressing plane 61 extending substantially vertically and perpendicularly to the longitudinal axes of the horizontal beams 4 so that the pressing planes 61 facing to each other are brought into contact with each other when the filter plate 6 connected to the head 3 is moved leftward by the cylinder 5. Filter cloths 15 extend over the pressing planes 61 respectively. Forward or upper ends 151 of the filter cloths 15 are supported by respective support bars 14 and are brought either up or down through the support bars 14 by filter cloth drawing devices described below when spaces are formed between the pressing planes 61 adjacent to each other by the movement of the cylinder 5. The filter cloths 15 extend over the pressing planes 61 and around guide rollers 17 or 18 fixed through brackets 20 on lower parts of the pressing plates 6 and are received or wound up by reservoir rollers 16. On periphery of each of the reservoir rollers 16, two of the filter cloths 15 are received and respective contacting surfaces for contacting with sludge are brought into contact with each other.

Each of the reservoir rollers 16 has a central shaft and a coil spring (these are not shown in the drawings) so that a torque on the central shaft is applied to the reservoir roller 16 to draw the filter cloths 15 toward the reservoir roller 16. Washing pipe 19 are arranged below the guide rollers 17 and 18 respectively so that the filter cloths 15 are washed by the washing pipe 19 when the filter cloths 15 are brought up or drawn out from the reservoir roller 16.

A driving shaft 12 extends above the horizontal beams 4 parallel to the longitudinal axes of the horizontal beams 4, that is, parallel to a moving direction of the filter plates 6 and are supported by bearings 10 fixed to the frames 1 and 2 respectively. As shown in FIG. 2, vertical lines passing outer diameters of pulleys 13 pass central points of the filter plates 6. The driving shaft 12 has a hexagonal cross section and is connected to a motor 11 with reduction gears through a coupling to be rotated in a normal direction or a reverse direction. Each of pairs of the pulleys 13 is mounted on a slider 13a which can slide on the driving shaft 12 and engages therewith to be rotated thereby. Each of the support bars 14 of the filter cloths 15 is suspended from the pulley 13 through a wire 23 whose one end is connected to an I-shaped hook 31 fixed to a central part of the support bar 14 and whose another end is wound around the pulley 13 so that the filter cloths 15 are brought up or down in accordance with a rotational direction of the pulleys 13.

Figure 3A:
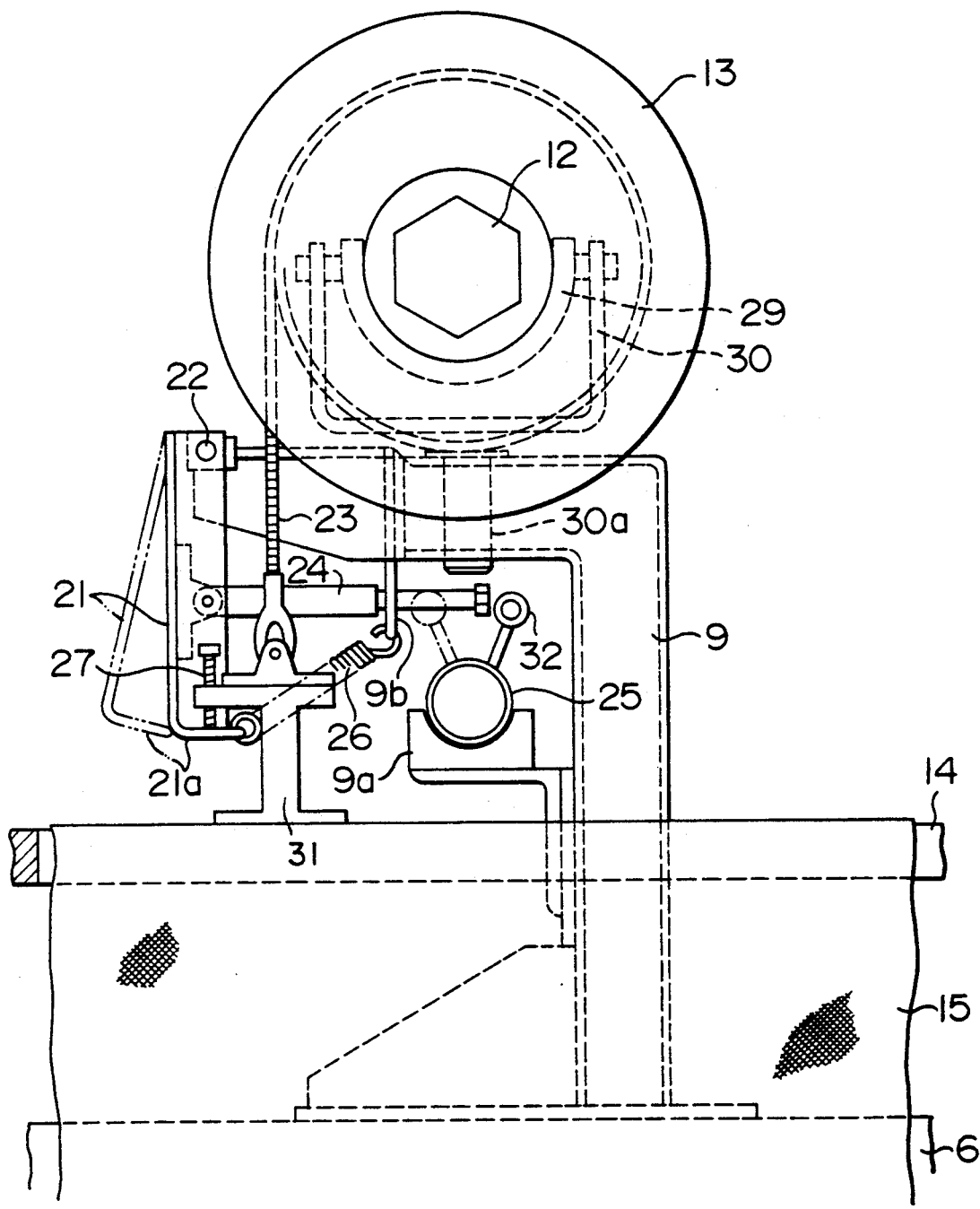
FIG. 3A is a plane view showing a filter cloth drawing device and a tension bearing device used in the embodiment of FIG. 1.
Figure 3B:
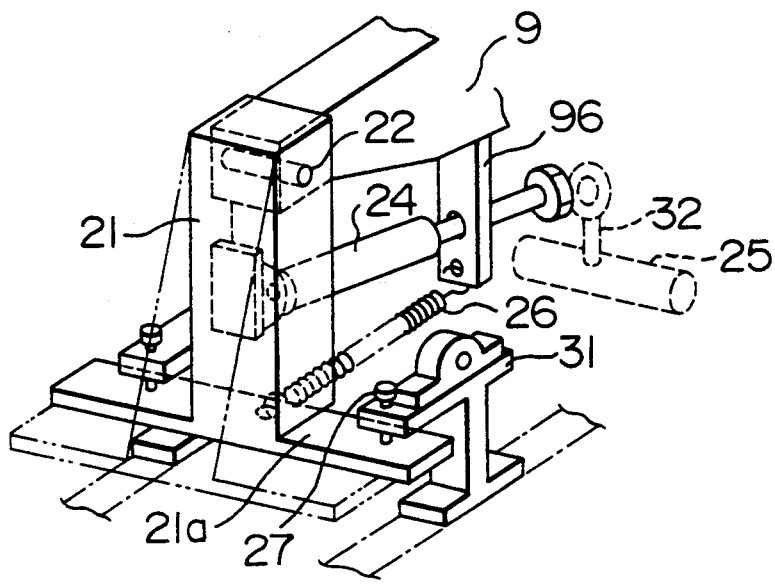
FIG. 3B is an oblique projection view showing the filter cloth drawing device and the tension bearing device used in the embodiment of FIG. 1.

Brackets 9 are mounted on the filter plates 6 respectively and support respective supporters 21 through pins 22 whose axes extend substantially parallel to the longitudinal axes of the horizontal beams 4 and on which the supporters 21 are swingable as shown in FIGS. 3A and 3B. Each of the supporters 21 has an engaging portion 21a whose central portion is connected to an end of a coil spring 26. And another end of the spring 26 is connected to a vertical column 9b of the bracket 9 so that a torque is applied to each of the supporters 21 for keeping an engaging position thereof as indicated by a continuous line in FIGS. 3A and 3B. At the engaging positions of the supporters 21, the engaging portions 21a engage with adjusting bolts 27 fitted in the hooks 31 of the support bars 14 to bear tensions of the filter cloths 15. The supporters 21 can be swung to a disengaging position by push rods 24 which are connected to the supporters 21 respectively and which are pushed by forward ends of rods 32 extending radially from a rocker shaft 25. The rocker shaft 25 is supported below the driving shaft 12 in a rotatable manner by shoes 9a on the brackets 9. When the rocker shaft 25 is rotated to swing the supporters 21 to the disengaging position indicated by a two-dot chain line in FIGS. 3A and 3B, the engaging portions 21a are disengaged from the adjusting bolts 27 of the hooks 31 so that the filter cloths 15 can be brought up or down freely. The rocker shaft 25 is driven by a not-shown cylinder through a driving rod 25a extending radially from the rocker shaft 25 as shown in FIG. 1.

Figure 4:
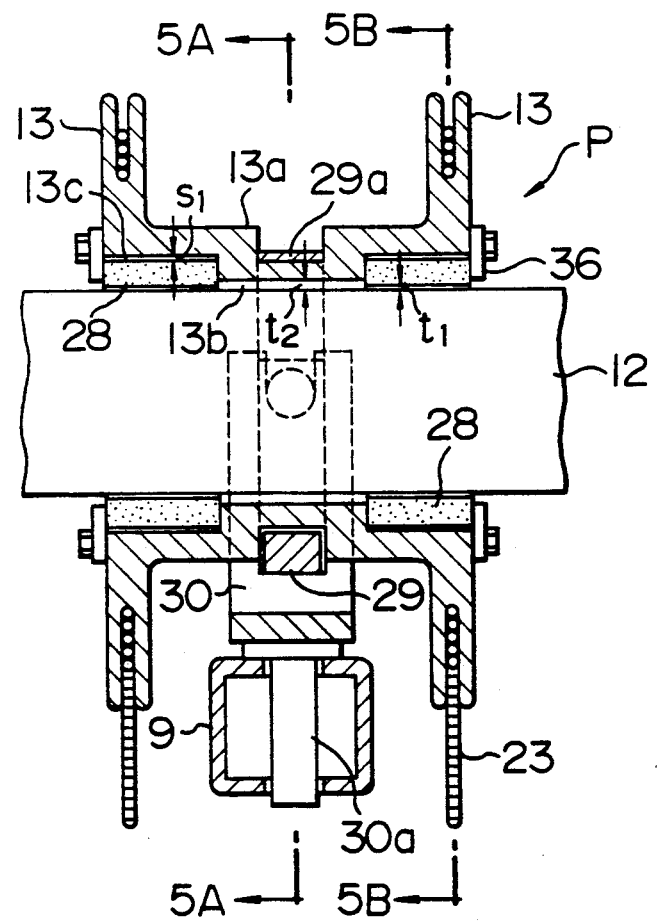
FIG. 4 is a longitudinal sectional view showing a pulley of the filter cloth drawing device and tension bearing device of FIGS. 3A and 3B.
Figure 5B:
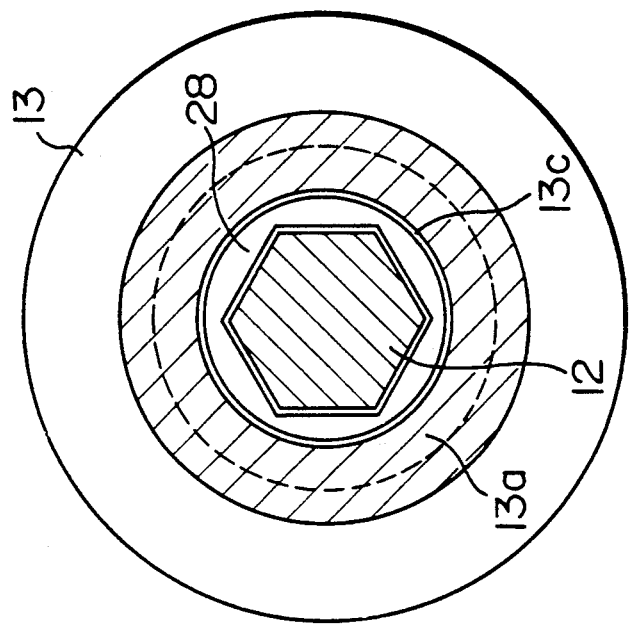
FIG. 5B is a cross sectional view taken along a line 5B of FIG. 4.
Figure 5C:
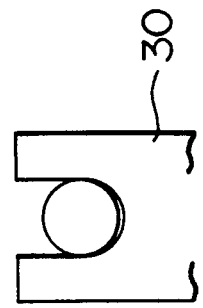
FIG. 5C is a partial plane view showing a pulley support structure in a direction indicated by an arrow 5C of FIG. 5A.
Figure 5A:
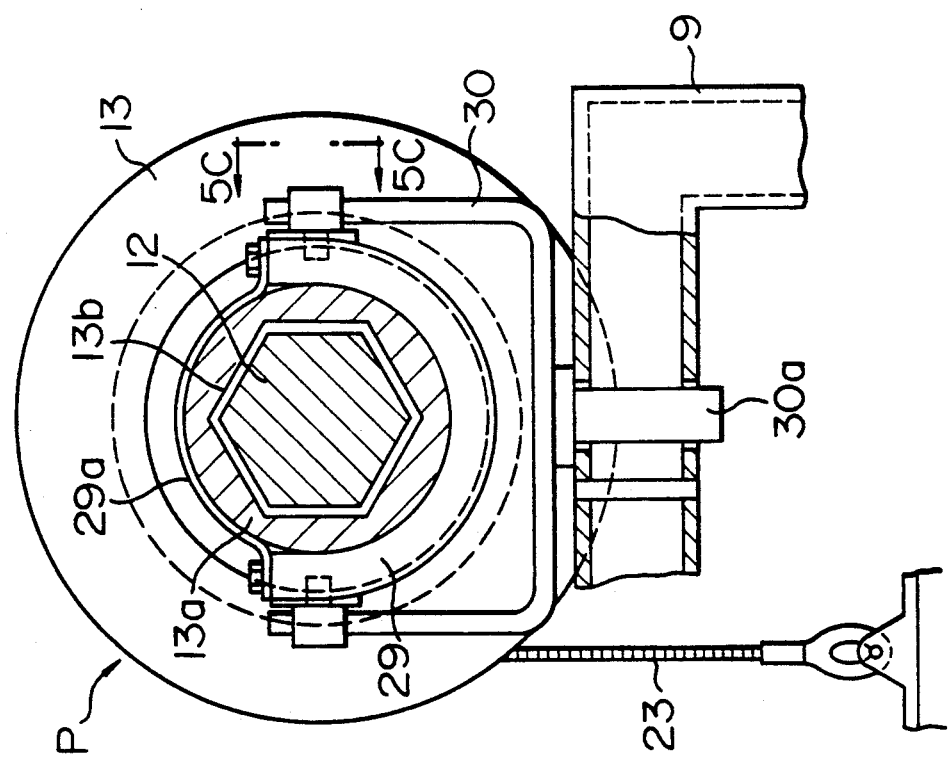
FIG. 5A is a cross sectional view taken along a line 5A of FIG. 4.

As shown in FIGS. 4, 5A and 5B, a central hole 13b of each of the sliders 13a has a hexagonal shape which corresponds to the hexagonal cross-sectional shape of the driving shaft 12 and which is slightly larger than that of the driving shaft 12, and longitudinal end holes 13c of each of the sliders 13a have respective circular shapes in which outer peripheries of bushes 28 are fitted. The bushes 28 have hexagonal holes with which the driving shaft 12 engages in a slidable manner and are made of a low-friction synthetic resin, for example, tetrafluoride ethylene or poliacetal. Stoppers 36 fixed to side surfaces of the sliders 13a prevent the bushes 28 from moving out from the end holes 13c.

A clearance t2 between the central hole 13b and the driving shaft 12 is larger than a total amount of a clearance t1 between the hexagonal holes of the bushes 28 and the driving shaft 12 and a clearance S1 between the longitudinal end holes 13c and the bushes 28. Therefore, the sliders 13a can rotate on the bushes 28 so that the sliders 13a are rotated by the driving shaft 12 with a backlash and the sliders 13a do not contact with the driving shaft 12 so that the sliders 13a can slide on the driving shaft 12 through the bushes 28.

A central annular recess extending on a plane perpendicular to longitudinal axes of the holes 13b and 13c on each of the sliders 13a is fitted in a rotatable manner in a circular space formed by a semicircular first yoke member 29 and a semicircular press member 29a. Each of the first yoke members 29 has pins which extend horizontally and perpendicularly to the longitudinal axes of the holes 13b and 13c and which can rotate and can longitudinally and vertically slide in respective grooves fitting with the pins and extending vertically on each of second yoke members 30, as shown in FIGS. 5A and 5C. Each of the second yoke members 30 has a pin 30a which extends vertically and which is supported in a rotatable manner on the bracket 9. Therefore, only a force parallel to the moving direction of the filter plates 6 is applied to the sliders 13a so that the sliders 13a are moved in accordance with the movements of the filter plates 6 through the brackets 9, the second yoke members 30, the first yoke members 29 and the press members 29a, but any rotational moment and any force other than the force parallel to the moving direction of the filter plates 6 are not applied to the sliders 13a.

Figure 7:
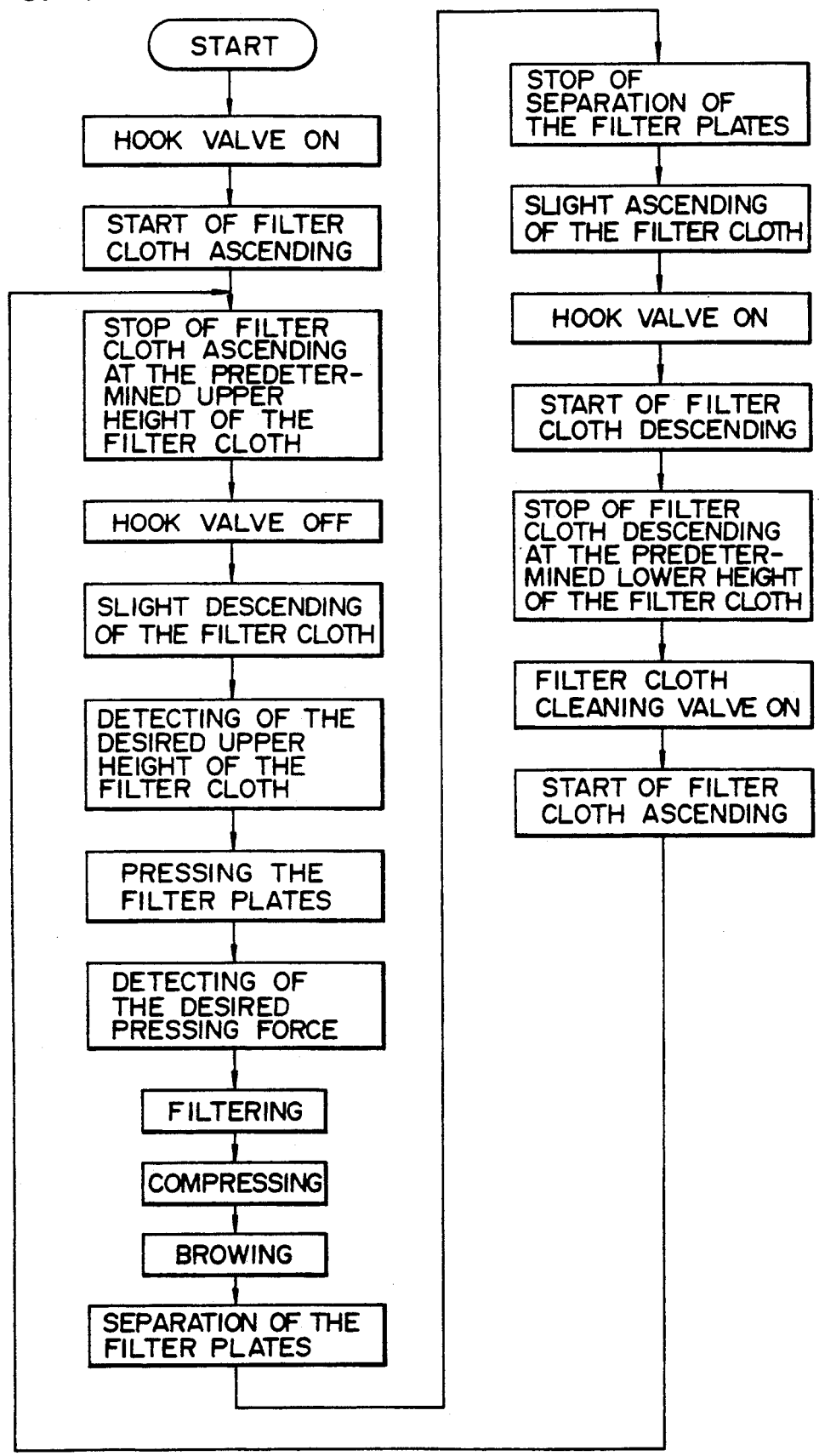
FIG. 7 is a diagram showing a flow chart of operation of the filter press according to the present invention.

The filter press described above is operated as shown in FIG. 7. When the operation of the filter press is started, the supporters 21 are moved to the disengaging position through the push rods 24, the rods 32 and the rocker shaft 25 by the cylinder controlled by an electromagnetic valve so that the hooks 31 do not engage with the supporters 21 and the filter cloths 15 can move freely.

Subsequently, the motor 11 rotates the driving shaft 25 to wind up the wires 23 on the pulleys 13 so that the filter cloths 15 are brought up through the support bars 14. When forward ends 151 of the filter cloths 15 are brought up to a predetermined height, a stop switch stops the rotation of the motor 11 so that the heights of the forward ends 151 of the filter cloths 15 are set at the predetermined degree. Thereafter, the cylinder controlled by the electromagnetic valve rotates the rocker shaft 25 to a start position thereof so that the supporters 21 are returned by the spring 26 to the engaging position so that the adjusting bolts 27 of the hooks 31 fixed to the support bars 14 can engages with the engaging portions 21a of the supporters 21. In this condition, the motor 11 rotates the driving shaft slightly to bring down the forward ends 151 of the filter cloths 15 so that the hooks 31 fixed to the support bars 14 engage with the engaging portions 21a of the supporters 21 connected to the filter plates 6 through the brackets 9 to keep the heights of the forward ends 151 of the filter cloths 15 and to bear tensions of the filter cloths 15. Therefore, the tensions of the filter cloths 15 are not applied to the pulleys 13 and tensions of the wires 23 are zero. A photoelectric sensor (not shown in the drawings) examines whether the foward ends 151 of the filter cloths 15 are held at a desired height or not.

Subsequently, the cylinder 5 fixed to the frame 2 moves the head 3 to bring the filter plates 6 adjacent to each other into contact with each other so that each pair of the filter cloths 15 extending over the pressing planes 61 facing to each other is received between the filter plates 6. Pressing pressure between the filter plates 6 is maintained at a predetermined degree. When the filter plates 6 are moved by the cylinder 5, the filter plates 6 run smoothly on the horizontal beam 4 and the sliders 13a on the driving shaft 12 are moved through the brackets 9 in accordance with the movements of the filter plates 6 with a small frictional force between the driving shaft 12 and the low-friction synthetic resin bushes 28. But, the tensions of the filter cloths are not applied to the sliders 13a through the pulleys 13 and the wires 23. Therefore, the sliders 13a slide smoothly on the driving shaft 12 and attitudes of the filter plates 6 are not changed by the tensions of the filter cloths 15.

Figure 8:
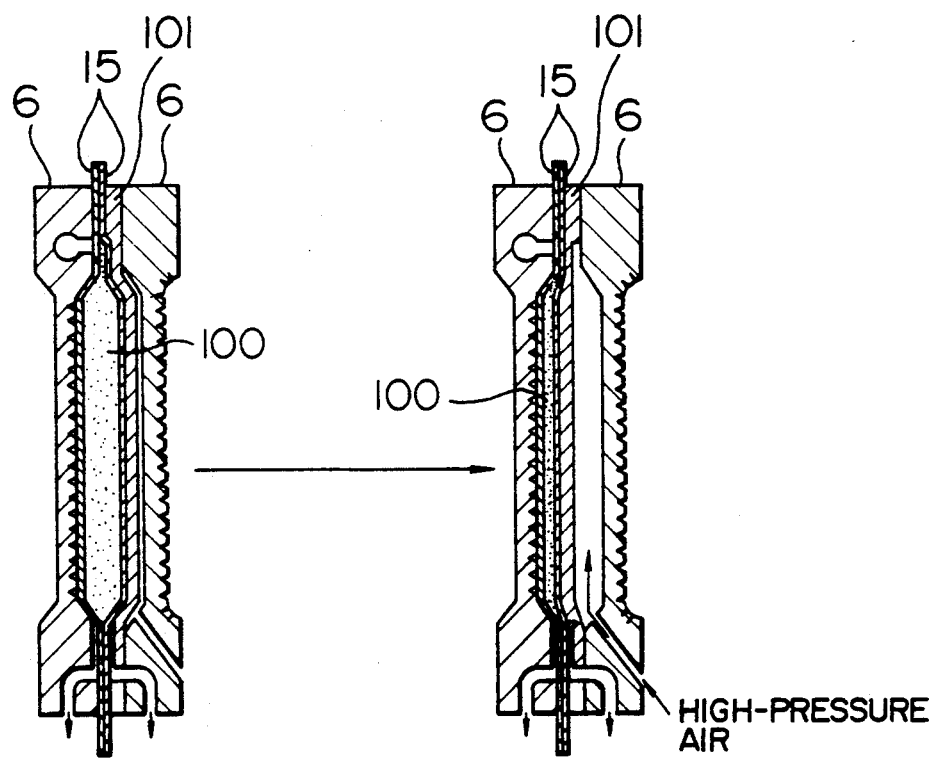
FIG. 8 is a schematic view showing a compression or dehydration structure of the filter press according to the present invention.

Subsequently, maintaining the intimate contacts between the pressing planes 61, as shown in FIG. 8, sludge 100 is inserted into each pair of the filter cloths 15 received between the pressing planes 61 facing to each other, and high-pressure air is inserted between the filter plates 6 and diaphragms 101 to compress and dehydrate the sludge 100 through the filter cloths 15.

Subsequently, the cylinder 5 moves the head 3 to separate the filter plates 6 from each other with distances determined by the tie rods 8, as shown in FIG. 1. After separation of the filter plates 6 is completed, the motor 11 rotates the pulleys 13 slightly to draw the wires 23 to bring up the forward ends 151 of the filter cloths 15 and the rocker shaft 25 is rotated to move the supporters 21 to the disengaging position through the rods 32 and the push rods 24. Thereafter, the motor 11 rotates the pulleys 13 to bring down the forward ends 151 of the filter cloths 15 so that the filter cloths 15 are wound up on the reservoir rollers 16 through the guide rollers 17 or 18 mounted on the filter plates 6 through the lower brackets 20.

Since the filter cloths 15 are bent on the guide rollers 17 or 18 when the filter cloths 15 are wound up on the reservoir rollers 16, the compressed and dehydrated sludge 100 is separated from the filter cloths 15. After the forward ends 151 of the filter cloths 15 reach a lower limit position, the rotation of the motor 11 is reversed to bring up the forward ends 151 of the filter cloths 15 again and cleaning water is ejected from the washing pipes 19 to wash the filter cloths 15.

Figure 6A:
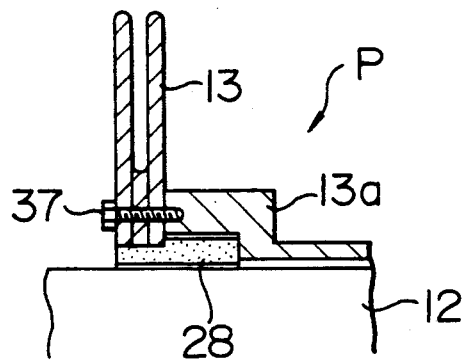
FIG. 6A is a cross sectional view showing another embodiment of the pulley of the filter cloth drawing device and tension bearing device.
Figure 6B:
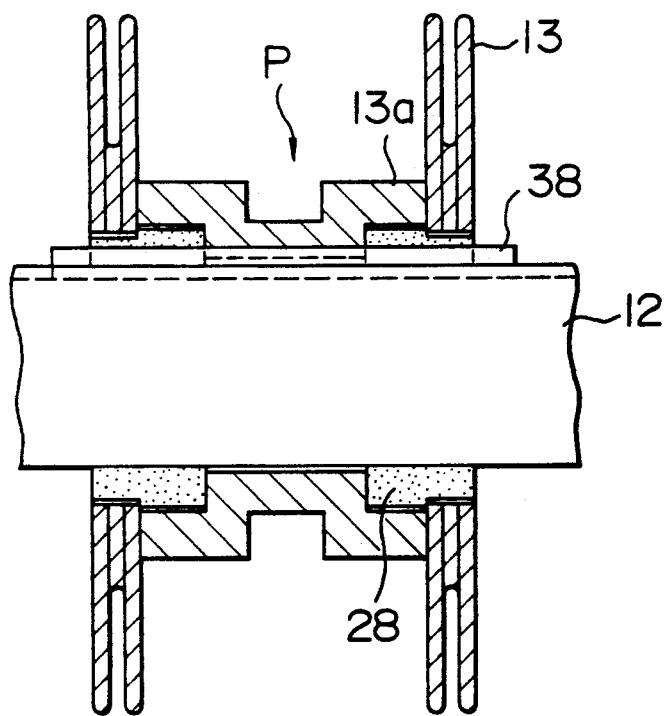
FIG. 6B is a cross sectional view showing the other embodiment of the pulley of the filter cloth drawing device and tension bearing device.

The pulleys 13 may be mounted on the sliders 13a by joining members, as shown in FIG. 6A. The driving shaft 12 may have a substantially circular cross section including a keyway for a key 38 and the holes of the sliders 13a may be fitted on the driving shaft 12, as shown in FIG. 6B.

As shown in FIG. 9, longitudinal ends of the support bars 14 supporting the forward ends 151 of the filter cloths 15 may engage with respective supporters 92 so that the tensions of the filter cloths 15 are born by the supporters 92 mounted on the filter plates 6 through brackets 91. Before the distances between the filter plates 6 adjacent to each other are decreased, the pulleys 13 are stopped and the supporters 92 are rotated by a motor or a cylinder to move to an engaging position where the supporters 92 engage with the support bars 14 and thereafter, the pulleys 13 are rotated slightly to bring down the forward ends 151 of the filter cloths 15 so that the tensions of the filter cloths 15 are born by the supporters 92. Alternatively, when the supporters 92 engage with the support bars 14, the supporters 92 may bring up slightly the support bars 14 so that the tensions of the wires 23 between the support bars 14 and the pulleys 13 become zero.

Figure 10A:
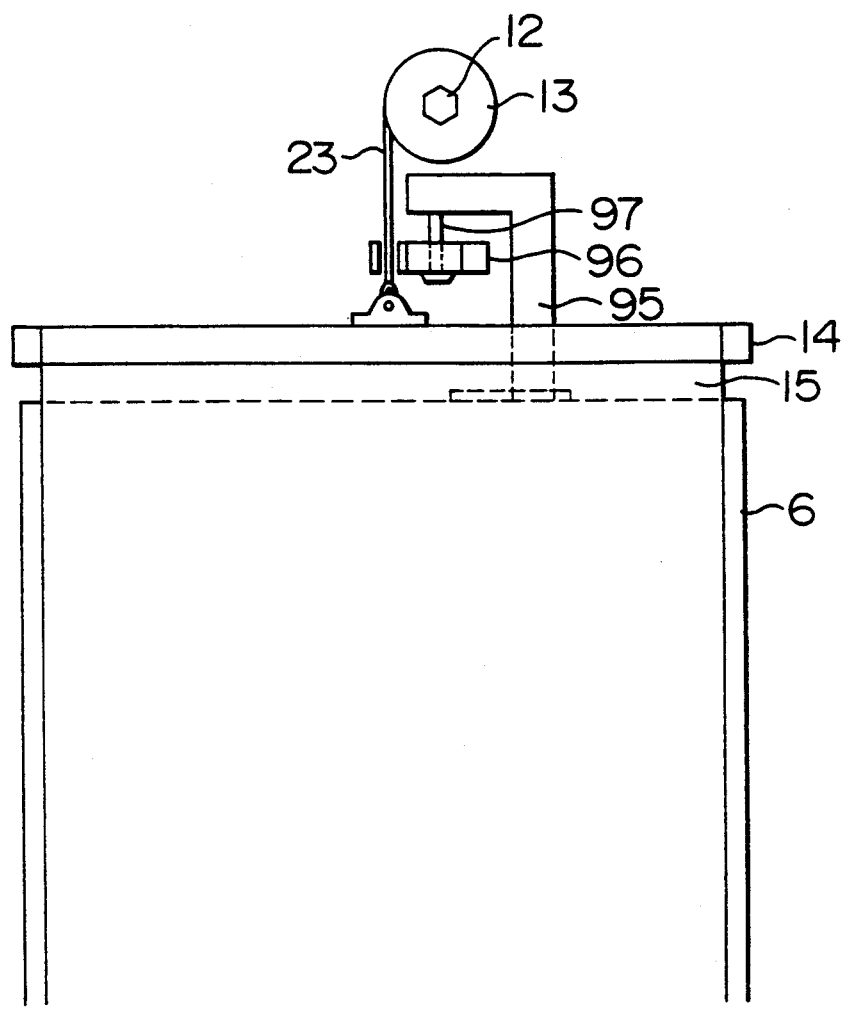
FIG. 10A is a schematic plane view showing the other embodiments of the filter cloth drawing device and the tension bearing device used in the filter press according to the present invention.
Figure 10B:
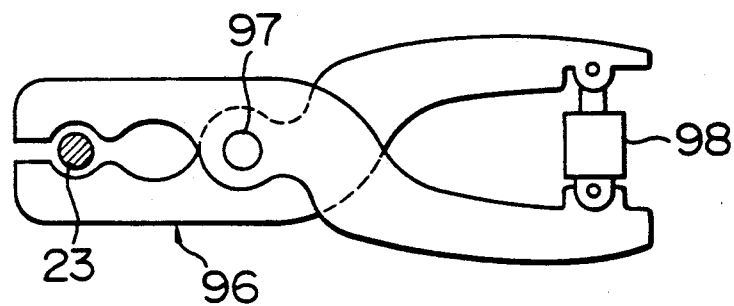
FIG. 10B is a schematic plane view showing a clamp device used in the embodiment of FIG. 10A.

As shown in FIG. 10, the wires 23 may be clamped by respective clamp devices 95 mounted on the filter plates 6 through brackets 95 and shafts 97. Before the distances between the filter plates 6 adjacent to each other are decreased, the pulleys 13 are stopped and the clamp devices 95 are driven by respective air cylinder 98 to clamp the wires 23 so that the tensions of the wires 23 are born by the clamp devices 95 to support the filter cloths 15.

What is claimed is:

1. A filter press comprising
    at least two filter plates each of which has at least one pressing surface and in which a distance between the filter plates adjacent to each other can be changed to bring the pressing surfaces adjacent to each other towards each other,
    guiding means for guiding the filter plates in a filter plate transferring direction oriented perpendicular to said pressing surfaces so that the pressing surfaces can be brought towards each other,
    at least two filter cloths which extend over the pressing surfaces respectively and which is capable of moving over the pressing surfaces,
    pressing plate driving means for changing in the filter plate transferring direction the distance between the filter plates adjacent to each other to bring the filter cloths which extend over the pressing surfaces adjacent to each other into contact with each other,
    cloth reservoir means which are mounted on the filter plates respectively for applying a predetermined tension to the filter cloths so that the filter cloths are urged toward the cloth reservoirs,
    drawing means which are connected to the filter plates respectively so that the drawing means move by a distance which corresponds with a change of the distance between the filter plates as driven in the filter plate transferring direction by said pressing plate driving means, said drawing means for drawing forward ends of the filter cloths away from the cloth reservoir means so that the filter cloths extend over the pressing surfaces respectively,
    shaft means which engage with the drawing means for supplying rotational driving force thereto to draw the forward ends of the filter cloths from the cloth reservoir means and on which the drawing means is slidably mounted,
    compression means for compressing sludge inserted between the filter cloths between the pressing surfaces when the filter cloths which extend over the pressing surfaces adjacent to each other are brought into contact with each other,
    tension bearing means, mounted on each of the filter plates, respectively, for selectively supporting the forward ends of the filter cloths to bear the tensions for drawing the forward ends of the filter cloths from the cloth reservoir means when the distance between the filter plates is decreased to being the filter plates adjacent to each other towards each other, so that the tension of the filter cloths are not applied to the shaft means via the drawing means when the distance between the pressing plates is decreased.

2. A filter press according to claim 1, wherein said drawing means further comprises:
    wires coupled to the forward ends of said filter cloths, for transmitting drawing tension to said forward ends of said filter cloths.

3. A filter press according to claim 2, wherein the tension bearing means further includes clamping means mounted to said filter plates for clamping said wires, to prevent longitudinal movement of the wires when the distance between the filter plates is decreased so that the tension of the filter cloths are not applied to the shaft means via the drawing means.

4. A filter press according to claim 1, wherein the filter press has:
    support bars connected to the drawing means and which extend over the whole widths of the filter cloths and are supportingly coupled to the forward ends of the filter cloths respectively so that the forward ends of the filter cloths are drawn through the support bars by the drawing by the drawing means, and the tension bearing means further includes engagement means for selectively engaging and disengaging the tension bearing means from the support bars, wherein said tension bearing means engages with the support bars to prevent movement of the forward ends of the filter cloths when the distance between the filter plates is decreased so that the tension of the filter cloths are not applied to the shaft means via the drawing means.

5. A filter press according to claim 1, wherein said drawing means slidably engages the shaft means through an aperture, said aperture having a shape which essentially corresponds to a cross-sectional shape of said shaft means, and is slightly larger than said cross-sectional shape of said shaft means, thereby providing backlash between said drawing means and said shaft means when rotational movement is imparted therebetween.

6. A filter press according to claim 1, wherein the drawing means are movably connected to the filter plates in a direction of the tensions of the filter cloths and in a direction perpendicular to the direction of the tensions of the filter cloths and to the pressing plate transferring direction.

7. A filter press according to claim 1, wherein the drawing means are connected to the filter plates, rotatably on an axis parallel to the direction of the tensions of the filter cloths, on an axis parallel to the filter plate transferring direction, and on an axis perpendicular to the direction of the tensions of the filter cloths and to the filter plate transferring direction.

* * * * *